(12) United States Patent
Cairns

(10) Patent No.: US 10,634,853 B2
(45) Date of Patent: Apr. 28, 2020

(54) DEVICE FOR SEALABLY CONNECTING CIRCUITS IN CONTAMINATED ENVIRONMENTS AND METHODS OF USING AND MAKING SAME

(71) Applicant: Pontus Subsea Connectors LLC, Ormond Beach, FL (US)

(72) Inventor: James L. Cairns, Ormond Beach, FL (US)

(73) Assignee: Pontus Subsea Connectors LLC, Ormond Beach, FL (US)

( * ) Notice: Subject to any disclaimer, the term of this patent is extended or adjusted under 35 U.S.C. 154(b) by 0 days.

(21) Appl. No.: 16/249,019

(22) Filed: Jan. 16, 2019

(65) Prior Publication Data

US 2019/0219770 A1 Jul. 18, 2019

Related U.S. Application Data

(60) Provisional application No. 62/617,701, filed on Jan. 16, 2018.

(51) Int. Cl.
*G02B 6/36* (2006.01)
*G02B 6/38* (2006.01)
(Continued)

(52) U.S. Cl.
CPC .......... *G02B 6/3816* (2013.01); *G02B 6/389* (2013.01); *H01R 13/5202* (2013.01); *H01R 13/523* (2013.01)

(58) Field of Classification Search
CPC .... G02B 6/3816; G02B 6/389; H01R 13/523; H01R 13/5202
(Continued)

(56) References Cited

U.S. PATENT DOCUMENTS

| 4,682,848 A | 7/1987 | Cairns et al. |
| 5,286,129 A | 2/1994 | French et al. |

(Continued)

FOREIGN PATENT DOCUMENTS

| EP | 0538089 B1 | 11/1997 |
| WO | 2018129042 A1 | 7/2018 |

OTHER PUBLICATIONS

International Search Report and Written Opinion for International Patent Application No. PCT/US19/13748 dated May 17, 2019.
(Continued)

*Primary Examiner* — Kaveh C Kianni
*Assistant Examiner* — Hung Q Lam
(74) *Attorney, Agent, or Firm* — Mark T. Vogelbacker

(57) ABSTRACT

A connector for sealably engaging and disengaging contacts therein can include a first unit and a second unit that is movable with respect to the first unit between an unmated position and a mated position. The first unit can have one or more closed chambers therein. Each closed chamber of the first unit contains fluid and one or more first contacts. The second unit can have one or more closed chambers therein, each closed chamber of the second unit containing fluid and one or more second contacts. Each second contact is configured to engage one of the first contacts. The one or more closed chambers of the first unit remain sealed from the one or more closed chambers of the second unit throughout mating and demating of the first and second units.

19 Claims, 9 Drawing Sheets

(51) Int. Cl.
*G02B 6/00* (2006.01)
*H01R 13/52* (2006.01)
*H01R 13/523* (2006.01)

(58) Field of Classification Search
USPC ........ 385/53, 56, 58, 60, 70–72, 75, 94, 139
See application file for complete search history.

(56) References Cited

U.S. PATENT DOCUMENTS

| | | |
|---|---|---|
| 5,645,438 A | 7/1997 | Cairns |
| 5,738,535 A | 4/1998 | Cairns |
| 5,838,857 A | 11/1998 | Niekrasz |
| 6,095,838 A | 8/2000 | Brickett |
| 6,315,461 B1 | 11/2001 | Carins |
| 6,929,404 B2 | 8/2005 | Jones et al. |
| 7,004,638 B2 | 2/2006 | Nicholson |
| 7,344,316 B2 | 3/2008 | McKinnon |
| 7,364,448 B2 | 4/2008 | Cairns et al. |
| 8,192,089 B2 | 6/2012 | Cairns et al. |
| 8,226,303 B2 | 7/2012 | Toth |
| 8,511,908 B2 | 8/2013 | Cairns et al. |
| 8,944,082 B2 | 2/2015 | Cairns |
| 2003/0007738 A1* | 1/2003 | Cairns .................. G02B 6/3816 385/56 |
| 2015/0340800 A1 | 11/2015 | Cairns |
| 2016/0072219 A1 | 3/2016 | Christiansen et al. |
| 2018/0193627 A1 | 7/2018 | Cairns |

OTHER PUBLICATIONS

U.S. Appl. No. 16/111,790, filed Aug. 24, 2018.

* cited by examiner

DEVICE FOR SEALABLY CONNECTING CIRCUITS IN CONTAMINATED ENVIRONMENTS AND METHODS OF USING AND MAKING SAME

CROSS-REFERENCE TO RELATED APPLICATION

The present application claims priority to U.S. Provisional Patent Application No. 62/617,701, filed Jan. 16, 2018 and titled "DEVICE FOR SEALABLY CONNECTING CIRCUITS IN CONTAMINATED ENVIRONMENTS AND METHODS OF USING AND MAKING SAME," which is hereby incorporated by reference in its entirety.

FIELD OF THE PRESENTLY DISCLOSED TECHNOLOGY

Embodiments of the presently disclosed device relate to an apparatus for sealably connecting and/or disconnecting electrical and/or fiber optic conductors underwater or in other hostile environments.

BACKGROUND

It is often desirable to connect communication and/or power circuits in contaminated environments such as found in sewers, in mines, in dust storms, underwater, and in diverse terrestrial and naval battlefield operations. In many cases, it is not possible to clean the connector contacts at the moment connections are made. Fiber-optic connections are especially vulnerable to contamination. If optical contacts are not clean they will not work well, or possibly not work at all. There is a category of connectors designed primarily for rugged subsea operations that permit the contacts to be cleaned in the manufacturing process, and afterward used repeatedly without subsequent cleaning. This category includes dual-chamber connectors in which plug and receptacle units each house pin and/or socket contacts within one or more closed, oil-filled chambers. When the plug unit and receptacle unit are mated, the contacts can pass from one or more chambers of the first unit into one or more chambers of the second unit wherein each contact engages its respective counterpart without ever having been exposed to the external environment in the process. The chambers are typically substantially filled with a benign mobile substance, such as grease, gel, or oil, hereinafter simply referred to as "oil" or "fluid," and are approximately pressure-balanced to the working environment by way of one or more movable portions of the chamber walls.

Examples of dual-chamber connectors are contained in U.S. Pat. Nos. 4,682,848; 5,286,129; 5,645,438; 5,738,535; 5,838,857; 6,095,838; 6,315,461; 6,929,404; 7,004,638; 7,344,316; 7,364,448; 8,192,089; 8,944,082; 8,511,908; 8,226,303; and in EP 0,538,089. All are characterized by the feature that before, during and after mating the plug and receptacle contacts are housed within closed oil chambers. They were all designed primarily for high-pressure underwater systems, and are extremely robust, complex, and expensive. As a result, they are not well suited for general harsh environment use or environments that are at least somewhat less harsh, thereby not requiring the same robustness or complexity or justifying the expense. Such prior art connectors would not serve to quickly and reliably connect optical circuits in a muddy foxhole, in the dark, or in the rain, for instance.

All prior-art dual-chamber connectors function generally as follows. Plug and receptacle units are brought face-to-face and aligned rotationally and axially. When thus positioned, and the units are joined, one or another mechanism creates a passageway between the units, connecting the fluid volume of the plug unit with that of the receptacle unit, thus forming, at least temporarily, one continuous fluid volume. Contacts from the first unit pass through the passageway to engage the respective contacts within the second unit. In some prior art connectors of this category, as the contacts from the first unit pass through the passageway they completely occupy the passageway, thus substantially closing it when the first and second units are completely mated; in others they do not close the passageway. However, in all dual-chamber prior-art connectors during mating and demating there is a free exchange of first unit fluid with the second unit fluid at one or more stages of the process.

In general use, dual-chamber plug and receptacle units are not dedicated pairs; in its lifetime each plug might mate with many receptacles, and vice-versa, just like the plugs and sockets in a residential home. Each time a prior art dual-chamber connector is mated, its fluid, at least temporarily, is freely mixed with the fluid of its mating counterpart. Contamination of the fluid in one connector unit, such as water or silt ingression, for instance, can be undesirably spread like a social disease, thereby degrading performance throughout the local connector population.

Despite the amount of prior art technology represented by the above-listed patents, there still does not exist in the marketplace a small, highly reliable connector that can go anywhere, whose contacts do not need to be cleaned between uses, can be connected and disconnected quickly in most any environment, does not freely exchange fluid between mating units, and yet is simple, efficient, and economical. The presently disclosed technology fulfills that and other needs in the art.

SUMMARY

Embodiments of the technology described herein provide for an apparatus which can include a first connector unit (hereafter also called the "plug" or "plug unit") and a second connector unit (hereafter also called the "receptacle" or "receptacle unit"), which can be repeatedly connected and disconnected in a wide variety of harsh, contaminated environments without maintenance or loss of integrity. The described embodiments could be used in myriad applications, wherein pin and socket contacts must remain isolated from the working environment before, during, and after mating and demating. The presently disclosed technology could equally well be suited for optical, electrical, or hybrid electro-optical connectors; however, for simplicity and ease of understanding, the technology is described herein with respect to what is normally the most difficult challenge, namely that of connecting optical conductors.

In one embodiment of the presently disclosed technology, the plug unit can house one or more optical contact assemblies in a fluid contained within a chamber sealed from the exterior environment. Each optical contact assembly can include an elongated shaft on whose end is mounted an optical contact. The receptacle unit can also house, in one or more chambers containing fluid and sealed from the exterior environment, another one or more optical contact assemblies each of which can also include an elongated shaft on whose end is mounted an optical contact. Optical contacts of the plug and receptacle units can be one of various sorts, such as expanded-beam lenses or physical contact ferrules. Furthermore, the physical contact ferrules can be one of several types including flat polished and angle polished ferrules. The one or more receptacle fluid chambers can each also contain a device, hereinafter called an alignment sleeve, for aligning the plug and receptacle contacts. Each alignment sleeve is disposed to receive in axial alignment a receptacle optical contact and a respective plug optical contact. Suitable optical contacts and alignment sleeves are readily available on the market from Kyocera, US Conec, and many other suppliers. Both the plug and receptacle units have resilient end portions including penetrable seals through which conductive elements of the connector units can sealably pass without being exposed to the ambient working environment.

In one embodiment, when the plug and receptacle units are joined, they are first moved face-to-face into axial and rotational alignment. As mating proceeds, resilient end portions of the plug and receptacle units can be pressed snugly against one another forcing out environmental material, and simultaneously sealing the interface between them.

Each plug and receptacle unit can have at least one penetrable seal including a bore and a tap integrally formed with a resilient end wall portion thereof. The bore and the tap can create a sealing engagement therebetween in the absence of an applied force whose magnitude is sufficient to displace the tap.

In one embodiment, when subjected to an applied force on the tap, the resilient end wall portion can be configured to (i) permit each one of the first contacts to sealably pass outward from the resilient bore of the plug unit (ii) to go on to sealably penetrate a respective resilient bore of the receptacle unit, and further onward into the receptacle closed chamber to (iii) engage one of the second contacts within a respective alignment sleeve within the receptacle closed chamber. Passages or movement of each one or more plug optical contacts from its plug chamber into a respective one or more receptacle chambers takes place without permitting fluid to flow through either the plug or receptacle end-seal bores. As a plug optical contact passes or moves from the plug unit into the receptacle unit through the sealed plug/receptacle interface, it is not exposed to the external environment. At least a portion of each closed chamber can be configured to be movable with respect to another portion of the closed chamber to permit at least approximate balancing of pressure within the closed chamber to pressure outside the closed chamber. The optical contacts within the plug and receptacle fluid chambers can remain sealed from the outside environment before, during, and after mating and demating of the plug and receptacle units; furthermore, the plug and receptacle closed chambers remain sealed from each other throughout the process, such that their fluids are never in communication.

BRIEF DESCRIPTION OF THE DRAWINGS

A one-circuit embodiment including at least some of the presently disclosed technology's salient features is presented herein in general terms without regard to any specific applications. It will be easily understood that the described apparatus can be readily adapted to a wide variety of housings, circuit numbers, contact types, and arrangements, sizes, materials, and/or exterior configurations.

Other features and advantages of the presently disclosed technology will become more readily apparent to those of ordinary skill in the art after reviewing the following detailed description and the accompanying drawings, in which like reference numbers refer to like parts.

DETAILED DESCRIPTION

Figure 1A:
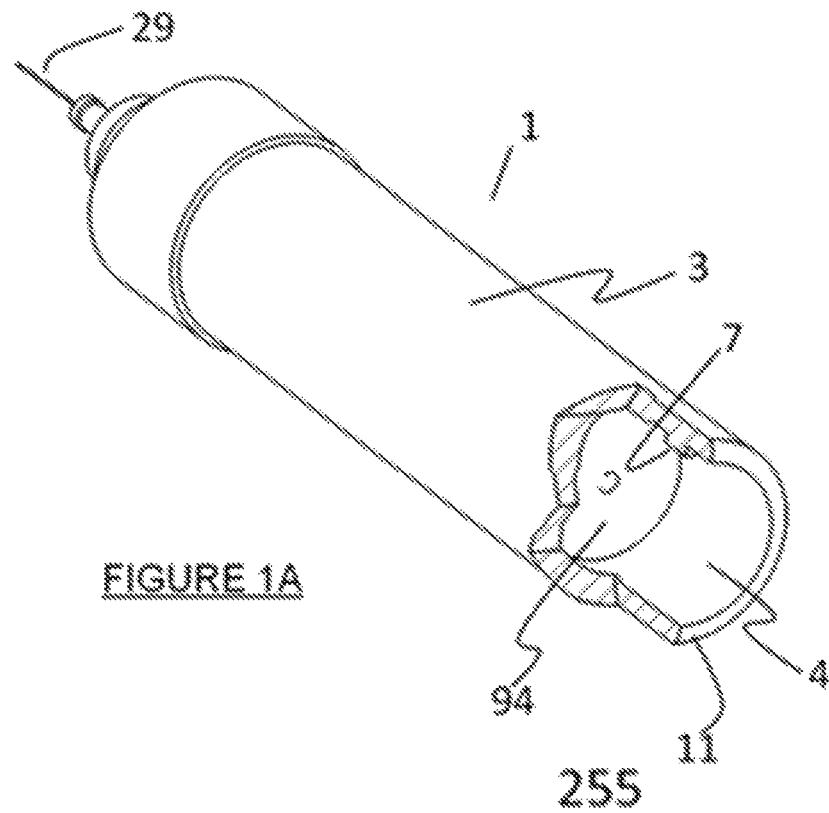
FIG. 1A is a perspective view of a plug unit in accordance with one embodiment of the presently disclosed technology.

Certain terminology is used in the following description for convenience only and is not limiting. The words "forward" and "rearward" (and derivations thereof) designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

Figure 1B:
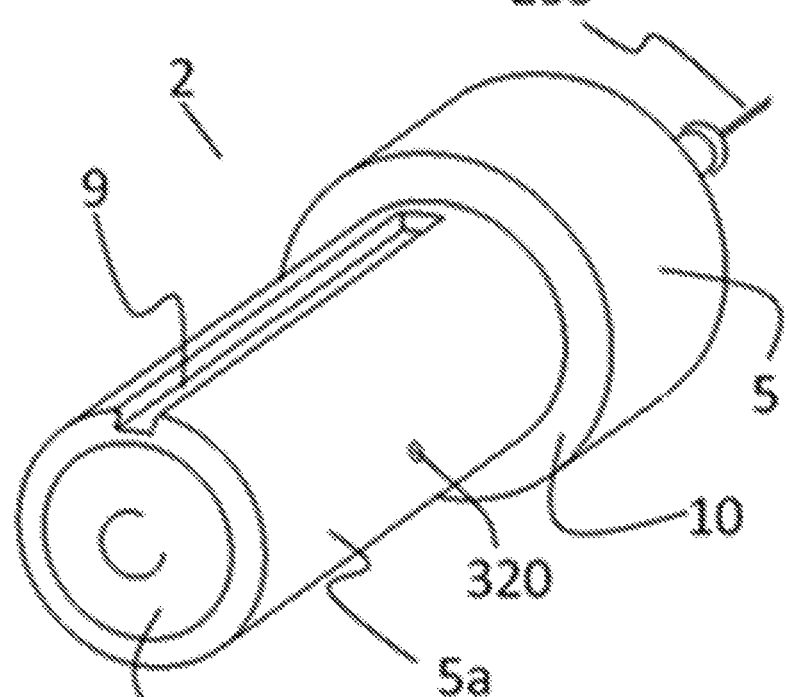
FIG. 1B is a perspective view of a receptacle unit in accordance with one embodiment of the presently disclosed technology.

FIGS. 1A and 1B illustrate a "one-circuit" or single contact embodiment of the presently disclosed connector, in which plug or plug unit 1 (sometimes referred to as "first unit") and receptacle or receptacle unit 2 (sometimes referred to as "second unit") are shown in perspective. Plug shell 3, shown partially cut-away in FIG. 1A, can include front bore 4 sized and/or shaped to receive in axial alignment forward end portion 5a of shell 5 of receptacle 2. Inward projecting mating alignment key 7 of plug shell 3 can cooperate with mating alignment keyway 9 in portion 5a of receptacle shell 5 to maintain or fix plug unit 1 and receptacle unit 2 in rotational alignment during and after mating. During mating, portion 5a of receptacle shell 5 can be inserted into front bore 4 of plug shell 3 until face 10 of portion 5a of receptacle shell 5 is stopped by face 11 of plug shell 3. Once mated, there are many known devices, such as threaded locking sleeves or opposed movable flange mountings, which could be incorporated to keep units 1 and 2 coupled together.

Figure 2:
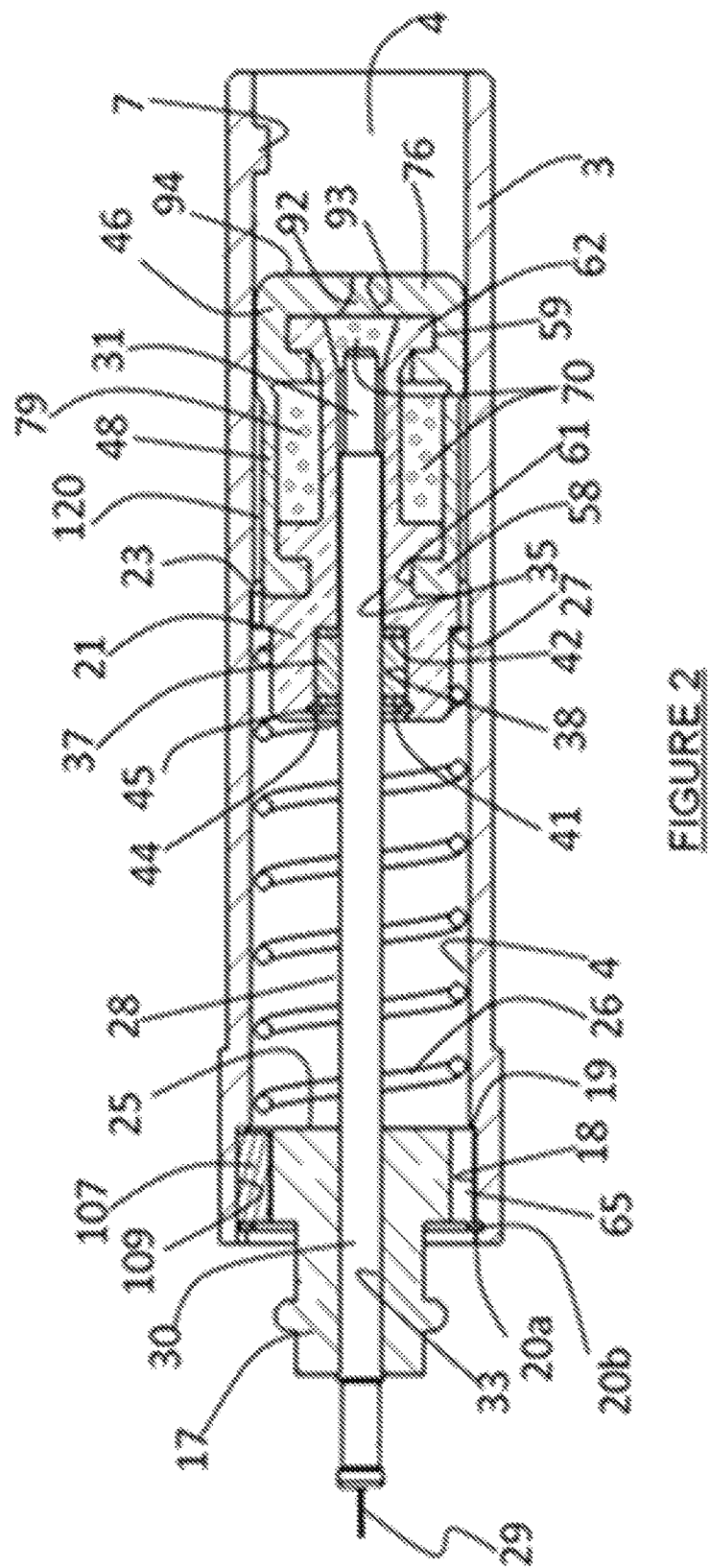
FIG. 2 is an axial cross-sectional view of the plug unit of FIG. 1A shown in an unmated condition.
Figure 3:
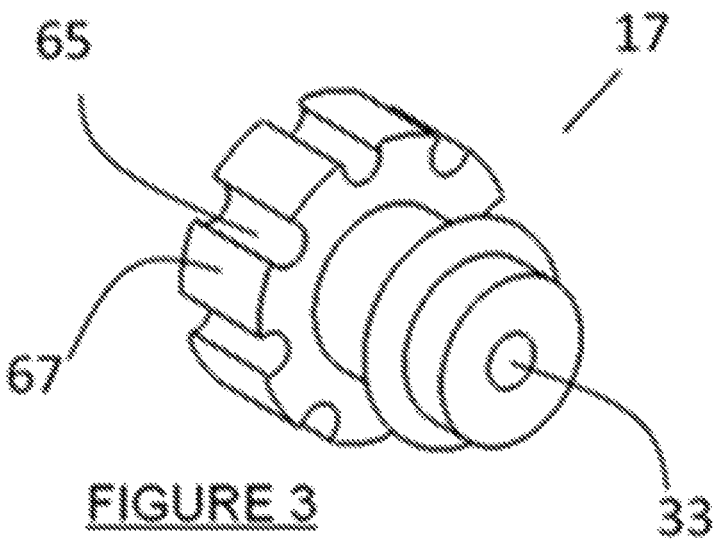
FIG. 3 is a perspective view of a plug base of the plug unit of FIG. 1A.
Figure 4:
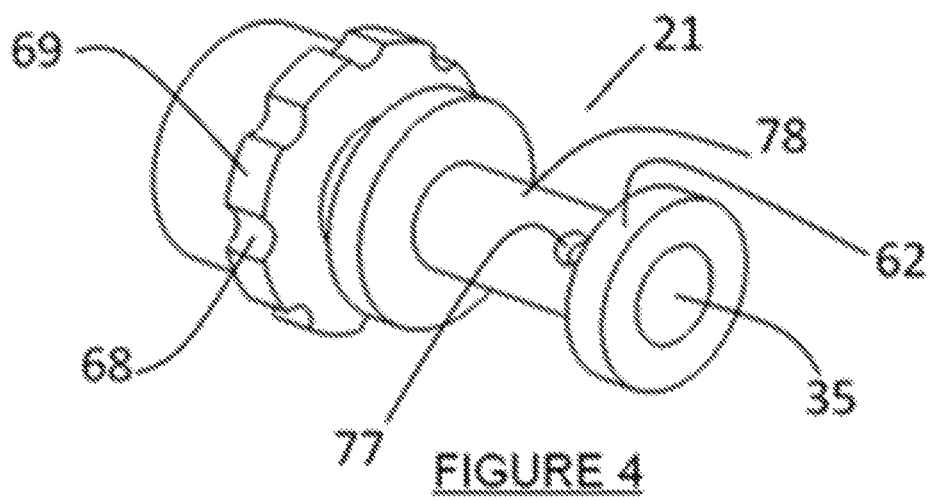
FIG. 4 is a perspective view of a plug inner shell of the plug unit of FIG. 1A.

FIG. 2 illustrates one embodiment of unmated plug 1 in axial half-section. Plug base 17 (see, also, FIG. 3) can mount into rear bore 18 of plug shell 3. The forward travel of plug base 17 within plug 1 can be limited by shoulder 19 of plug shell 3. Plug base 17 can be arrested from rearward motion within bore 18 by retainer ring 20a seated in groove 20b of plug shell 3. Plug inner shell 21 (see, also, FIG. 4) is free to move axially within front bore 4 of plug shell 3 between a forward extreme limited by shoulder 23 formed by a step within front bore 4 of plug shell 3, and a rearward extreme limited by face 25 of plug base 17. Alternately, in some constructions the rearward extreme of the axial travel of plug inner shell 21 can be limited by the solid or compressed height of spring 26. In one embodiment, spring 26 can be a compression spring constrained on its rearward end by face 25 of plug base 17 and on its forward end can be forced against face 27 of plug inner shell 21. Front bore 4 of plug shell 3 acts as a squirm guide or stabilizer for spring 26.

Figure 5:
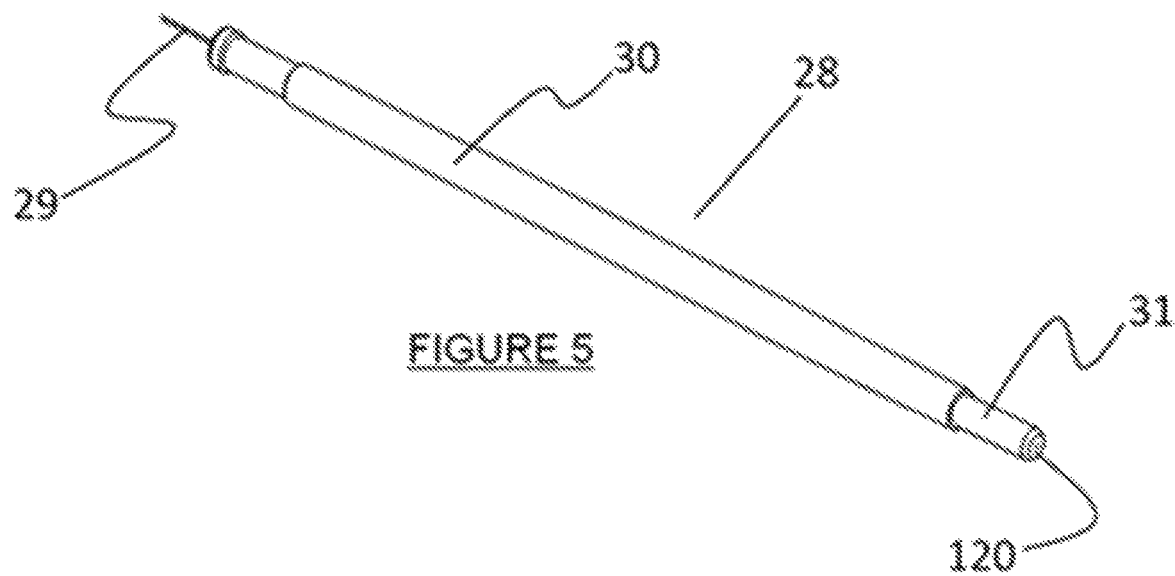
FIG. 5 is a perspective view of a plug contact assembly of the plug unit of FIG. 1A.

Referring to FIGS. 2 and 5, plug contact assembly 28 of plug shell 3 can include conductor 29 within elongated shaft 30 terminated on its forward end by at least one contact 31. At least a portion of elongated shaft 30 of contact assembly 28 can be sealably fixed within bore 33 of plug base 17. A forward portion of elongated shaft 30 can slidably pass through bore 35 of plug inner shell 21. In one embodiment, elongated shaft 30 can exhibit a predetermined amount of flexibility.

As shown in FIG. 2, elastomeric gland seal 37 mounted in bore 38 of plug inner shell 21 can seal to a portion of elongated shaft 30 and simultaneously to bore 38. Spaced-apart washers 41, 42 can back up or support gland seal 37. Snap ring 44 mounted in groove 45 of plug inner shell 21 can retain washers 41, 42 and gland seal 37 within bore 38 of plug inner shell 21.

In one embodiment, plug bladder 46 (see FIGS. 2, 6, and 7) can be made from resilient or elastomeric material. Plug bladder 46 can include radial wall portion 48, with radially projecting axial lands 50 separated by grooves 51, end wall portion 76, inwardly directed shoulder 58 opposite end wall portion 76, and internal groove 59 proximate end wall portion 76. Plug bladder 46 mounts onto and/or surrounds at least a portion of plug inner shell 21. Shoulder 58 of plug bladder 46 can fit sealably into and be retained by groove 61 on plug inner shell 21. Internal groove 59 of plug bladder 46 can fit onto and be retained by shoulder 62 of plug inner shell 21.

Radially spaced-apart lands 50 of plug bladder 46 can keep plug bladder 46 centered with respect to the longitudinal axis of front bore 4 of plug shell 3, while ventilation of gas and/or liquid is permitted between plug bladder 46 and front bore 4 via grooves 51. Similarly, one or more radially spaced-apart axial slots 65 (see FIGS. 2 and 3) in outer diameter 67 of plug base 17 can permit ventilation between plug base 17 and rear bore 18 of plug shell 3. Further ventilation through the interior of plug shell 3 is provided by radially spaced-apart slots 68 in outer diameter 69 of plug inner shell 21 (see FIG. 4).

Figure 7:
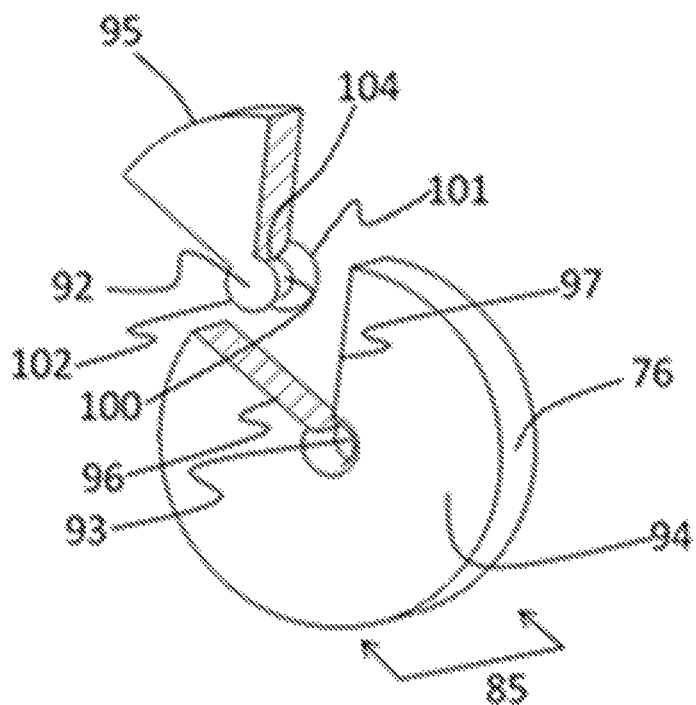
FIG. 7 is a perspective view of a tap-and-bore end seal with a wedge-shaped section displaced radially in accordance with one embodiment of the presently disclosed technology.

Referring to FIGS. 2 and 7, fluid chamber 70 can be sealed (i) by shoulder 58 of bladder 46 stretched into slot 61 of plug inner shell 21, (ii) by gland seal 37 acting against elongated shaft 30 of plug contact assembly 28, and (iii) by resilient end wall portion 76 of bladder 46. Port 77 (see FIG. 4) through wall 78 of plug inner shell 21 can fluidly connect the interior of plug inner shell 21 with the main portion of chamber 70, thereby resulting in a single extended fluid chamber. In one embodiment, when fluid chamber 70 is sealed it is at least substantially filled with fluid 79 (see FIG. 4). For many applications, the fluid can be Silicone oil such as Dow Corning DC 200, which is benign, dielectric, transparent, and has an index of refraction close to that of many optical fibers. Other fluids or mobile fillers such as grease or gel are certainly possible. Radial wall portion 48 of plug bladder 46 can be flexible and can be exposed to the ambient environment via the abovementioned ventilation paths, and therefore can approximately balance, adjust, or equal the pressure of fluid 79 within chamber 70 to that of the ambient environment.

Figure 6:
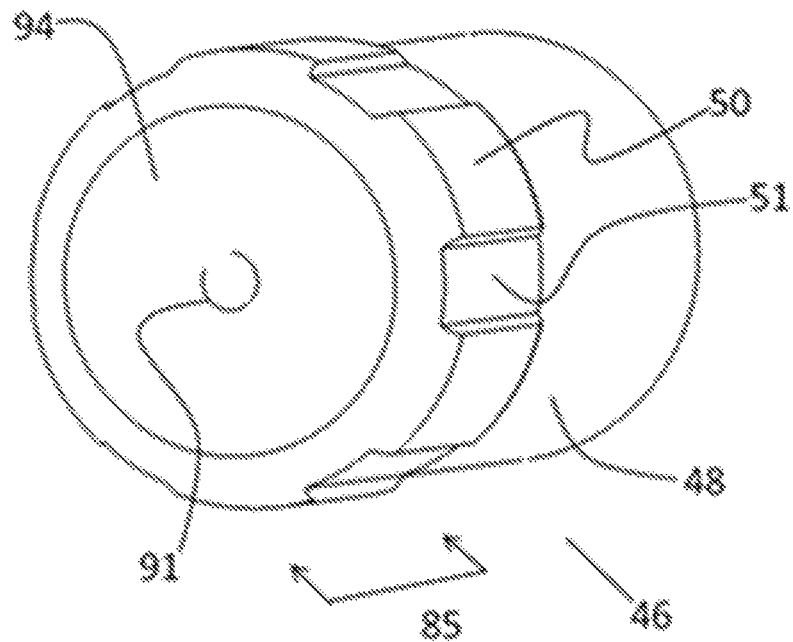
FIG. 6 is a perspective view of a plug bladder of the plug unit in accordance with one embodiment of the presently disclosed technology.

As shown in FIGS. 6 and 7, end wall portion 76 of plug bladder 46 can have at least one penetrable end seal 85 including one or more perforations 91 therein or therethrough. In one embodiment, the perforation 91 can be crescent-shaped, thus forming tap 92 and bore 93. Details of the fabrication and operation of embodiments of such a tap-and-bore seals as well as some of their applications are disclosed in co-pending U.S. patent application Ser. No. 15/861,098, International Patent Application No. PCT/US18/12184, and U.S. patent application Ser. No. 16/111,790, which are hereby incorporated by reference. FIG. 6 is a perspective view of one embodiment of plug bladder 46 showing on face 94 the outline of crescentic perforation 91. In one embodiment, perforation 91 can cut axially through the entire thickness of end wall portion 76 of plug bladder 46, not necessarily with a circular or uniform diameter, thereby resulting in tap 92 and bore 93. End wall portion 76, tap 92, and bore 93 (see FIGS. 6 and 7) together can form integral or monolithic, penetrable end seal 85 of plug bladder 46. Seal 85 and its integral parts may be easier to visualize in FIG. 7 in which, for purposes of better understanding, a portion 95 is shown cut away axially from end seal 85 along lines 96, 97, which radiate outwardly from the ends of crescentic perforation 91. Cutaway portion 95 is displaced radially in FIG. 7 for clarity. Tap 92 can include central portion 100 having flared segment 101 on one end, and flared segment 102 on the other opposing end. Tap 92 can remain attached to the main portion of end seal 94 by uncut portion 104 of perforation 91. Uncut portion 104 can provide a substantial elastic force to retain tap 92 in its initial or at-rest position within bore 93 when end seal 85 is not penetrated. Flared end segments 101, 102 of tap 92 can aid in centering the tap axially within bore 93 when end seal 85 is not penetrated, and can enhance both the wiping and sealing functions of the tap during the mating and un-mating operations.

Plug base alignment key 107 (FIG. 2) in cooperation with one of slots 65 in plug base 17 and in further cooperation with keyway 109 of plug shell 3 can lock plug base 17 and plug shell 3 in rotational alignment (i.e., prevent plug base 17 from rotating with respect to plug shell 3). Optical connections can sometimes be improved by rotationally "tuning" or slightly repositioning the contacts. Multiple slots 65 in plug base 17 can allow multiple rotational alignment positions between plug base 17 and contact assembly 28 relative to plug shell 3, thereby providing multiple tuning positions. Inward projecting mating alignment key 7 of plug shell 3 in cooperation with mating keyway 9 (see FIG. 1B) in portion 5a of receptacle shell 5 can maintain rotational alignment of plug shell 3 and receptacle shell 5.

In one embodiment, plug unit 1 can include one or more elements that, once assembled, remain fixed in relative position to plug shell 3. The fixed element(s) can include plug base 17, snap ring 20a, plug contact assembly 28, and alignment key 107. Spring 26 is fixed on its rear end against face 25 of plug base 17, but can be compressed or extended axially. In one embodiment, all of the other components of plug unit 1 are attached to plug inner shell 21 and are movable axially as a unit within plug shell 3.

Figure 8:
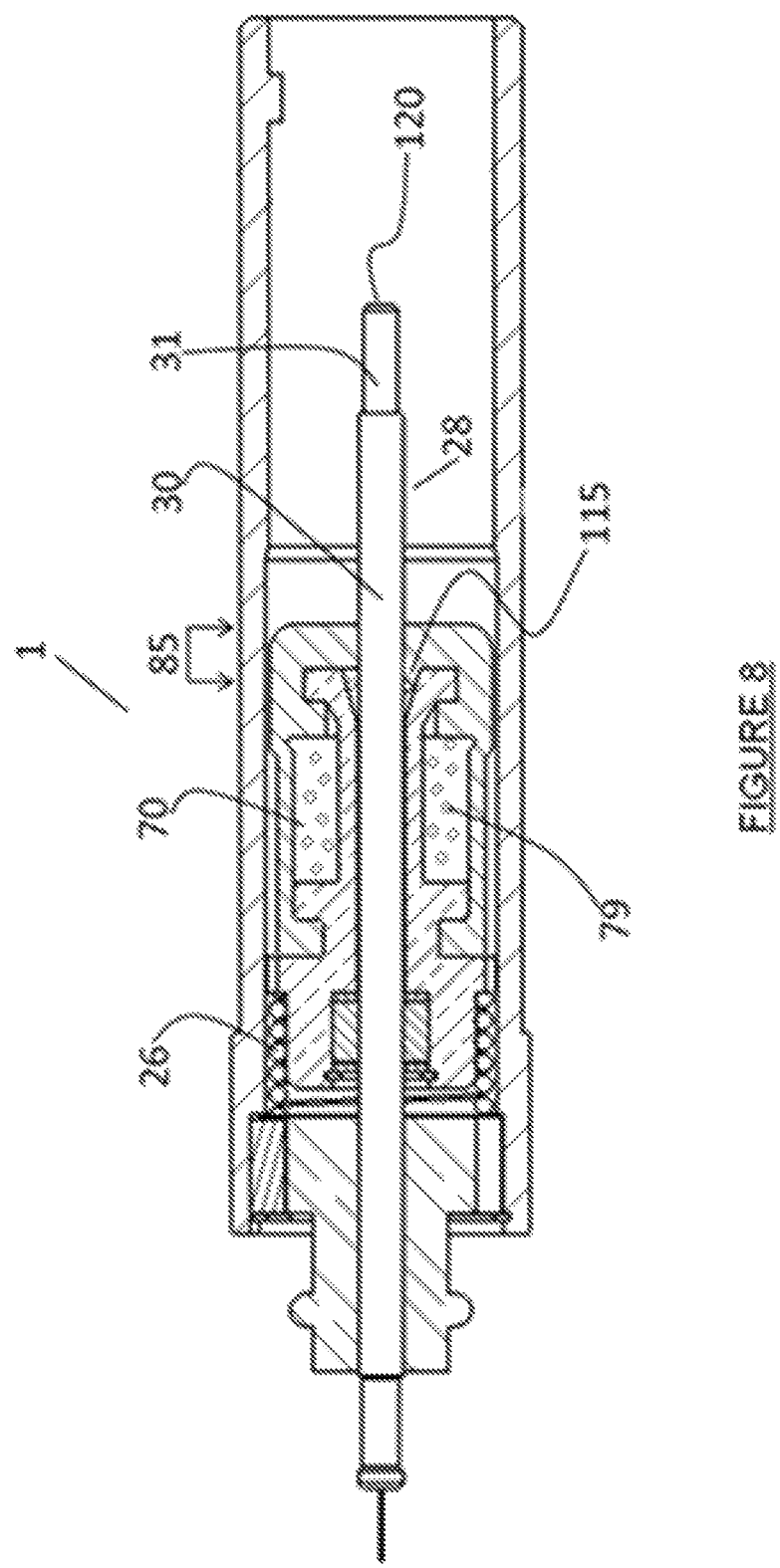
FIG. 8 is an axial cross-sectional view of the plug unit shown in FIG. 1A shown in a mated condition, wherein the receptacle unit is omitted for simplicity and clarity.

FIG. 8 is an axial cross-section of plug unit 1 in which all of the elements are in the position as if plug unit 1 and receptacle unit 2 were mated. Receptacle unit 2 is not shown. The movable elements of plug unit 1 are displaced rearwardly within front bore 4 of plug shell 3. The forward portion of plug contact assembly 28 including at least a portion of elongated shaft 30 and contact 31 emerge or extend outward through end seal 85 of plug bladder 46 as the movable elements of plug unit 1 are displaced rearwardly therein during mating with receptacle unit 2. As at least a portion of contact assembly 28 penetrates or extends out through plug end seal 85, it displaces tap 92 (see FIG. 7) from its initial, closed, or sealed position. The displaced material of tap 92 causes portion 115 of tap 92 to extrude or extend backwards into chamber 70

It may seem counter-intuitive that a portion of tap 92 moves in the same direction as the movable elements or against the direction of penetrating contact assembly 28. Consider that the interface between contact assembly 28 and plug end seal 85 is bathed in oil, and hence well lubricated, and that face 94 of plug bladder 46 is pressed tightly against the corresponding face 210 (see FIG. 1B) of receptacle unit 2 during mating. As face or tip 120 of plug contact assembly 28 is forced against tap 92 of plug end seal 85 there is no place for the displaced tap to go but backwards. Face 120 can be flat or angled. Mating face 210 of receptacle unit 2 blocks forward travel of the displaced tap, and the oil facilitates at least portion 115 of tap 92 slipping or moving back into chamber 70.

Figure 9:
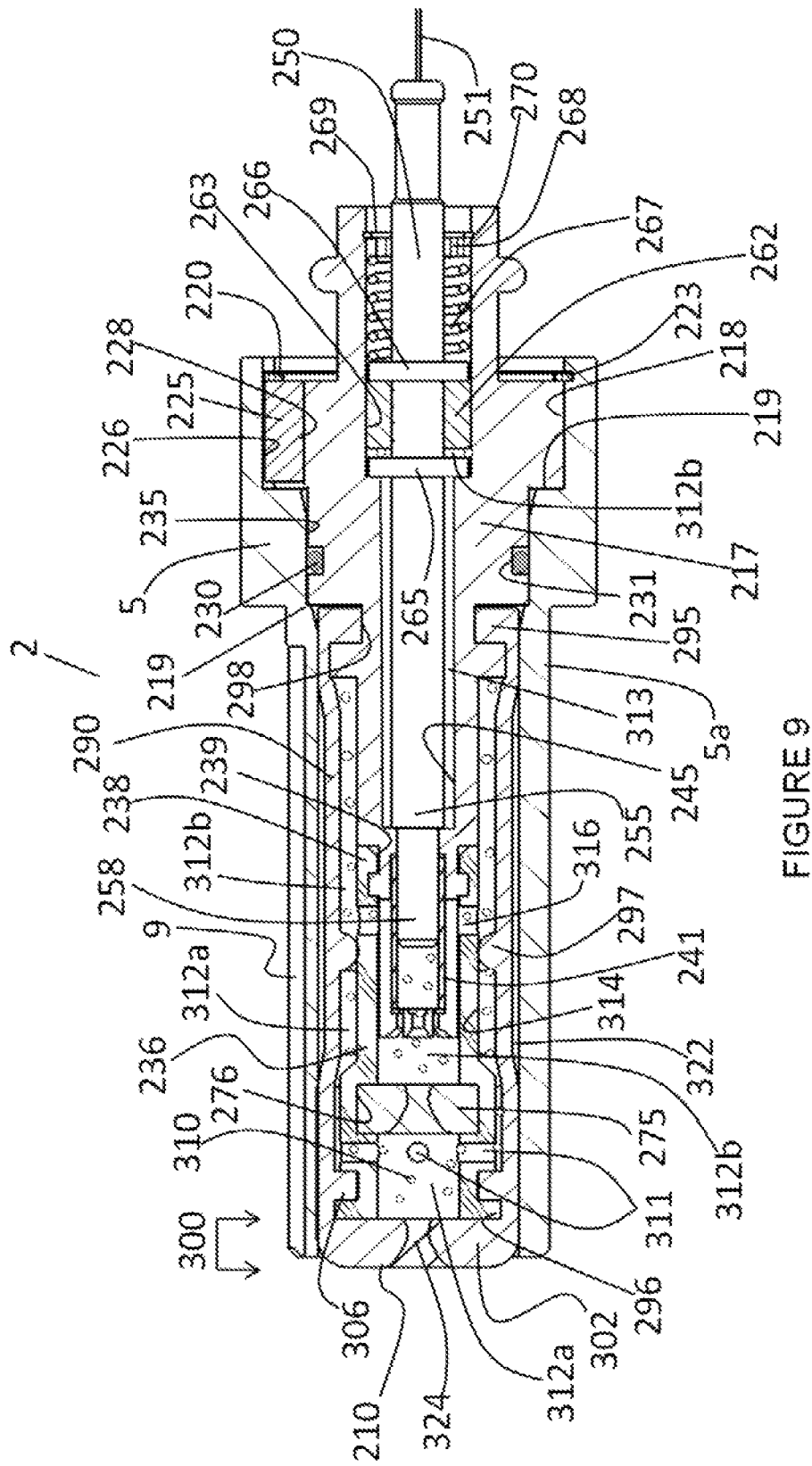
FIG. 9 is an axial cross-sectional view of the receptacle unit of FIG. 1B shown in an unmated condition.

FIG. 9 illustrates one embodiment of unmated receptacle unit 2 in axial half-section. Receptacle base 217 can mount into rear bore 218 of receptacle shell 5. The forward travel of receptacle base 217 within receptacle 2 can be limited by shoulder 219 of receptacle shell 3. Receptacle base 217 can be arrested from rearward motion within bore 218 by retainer ring 220 seated in groove 223 of receptacle shell 5. Receptacle base 217 is rotationally locked to receptacle shell 5 by alignment key 225, which is captured in slot 226 of shell 5 and in slot 228 of receptacle base 217 by snap ring 220. O-ring 230, seated in groove 231 of receptacle base 217, can seal the interface between receptacle base 217 and bore 235 of receptacle shell 5.

Figure 11:
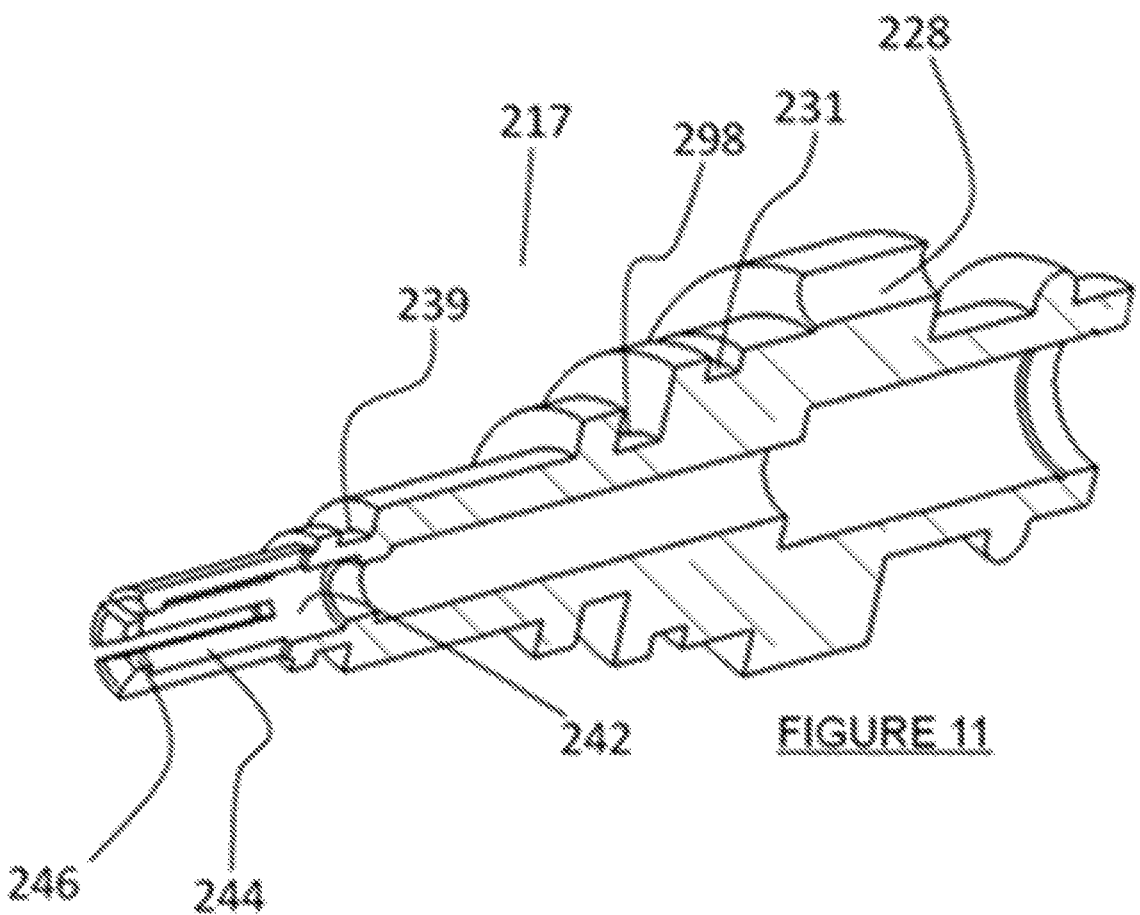
FIG. 11 is an axial cross-sectional perspective view of a receptacle base of the receptacle unit of FIG. 1B.
Figure 12:
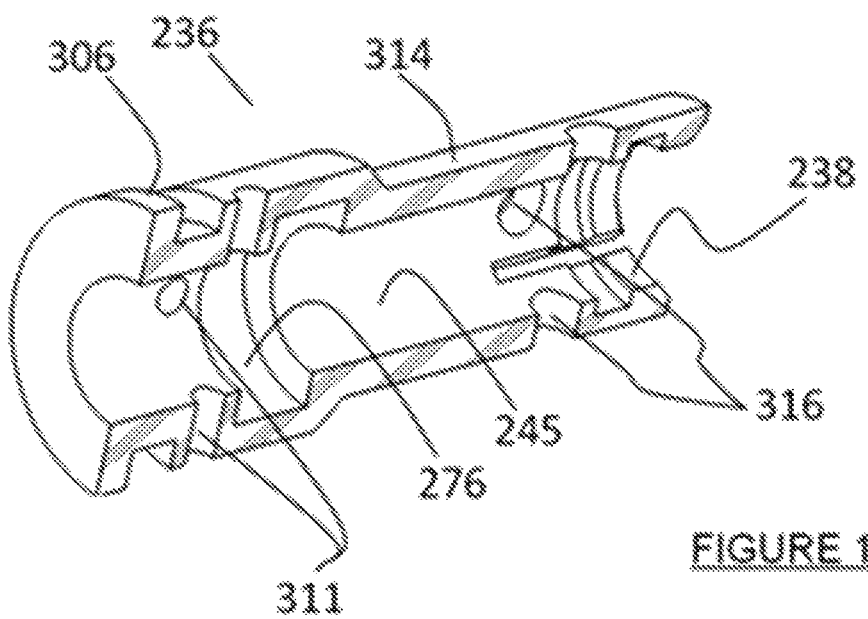
FIG. 12 is an axial cross-sectional perspective view of a receptacle inner shell of the receptacle unit of FIG. 1B.

Receptacle inner shell 236 mounts onto the forward end of receptacle base 217. Receptacle inner shell 236 is captured in place on inner shell 217 by rearward projecting tabs 238 (see FIGS. 9 and 12) on the rear end on receptacle inner shell 236. Tabs 238 can snap into groove 239 of receptacle base 217 (see FIGS. 9, 11 and 12).

Optical alignment sleeve 241 (see FIG. 9) seats in bore 242 of receptacle inner shell 217. Spaced-apart tines 244 on the forward portion of inner shell 217 can spring apart or at least slightly outwardly to permit insertion of optical alignment sleeve 241 into bore 242. Once optical alignment sleeve 241 is in place, inward projecting cleats 246 on the forward end of inner shell 217 can retain alignment sleeve 241 in axial position. When receptacle inner shell 236 is mounted in position on the forward end of receptacle base 217, bore 245 of receptacle inner shell 236 can keep tines 244 of inner shell 236 from springing apart, thus capturing alignment sleeve 241 in diameter 242 of receptacle inner shell 236.

Figure 10:
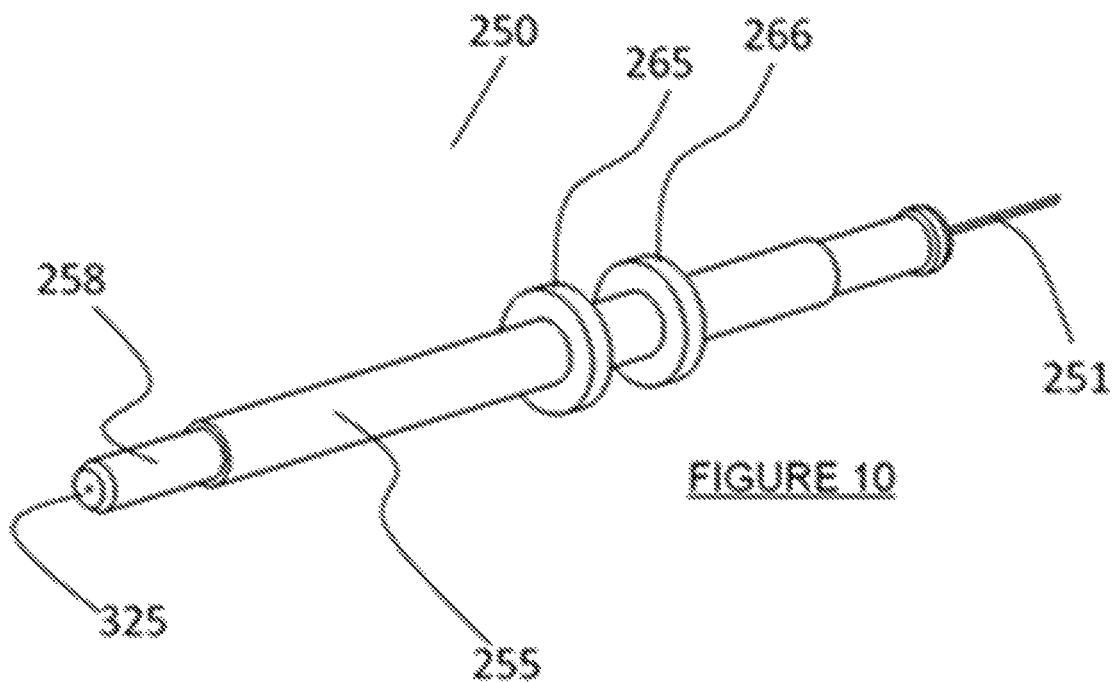
FIG. 10 is a perspective view of a contact assembly of the receptacle unit of FIG. 1B juxtaposed with a ferrule bushing.

Referring to FIGS. 9 and 10, receptacle contact assembly 250 can include conductor 251 within elongated shaft 255 terminated on its forward end by contact 258. At least a portion of elongated shaft 255 of contact assembly 250 extends into and can freely move along a longitudinal axis of receptacle unit 2 within rear bore 245 and front bore 263 of receptacle base 217. Elastomeric gland seal 262 mounted in bore 263 of receptacle base 217 can seal to a portion of elongated shaft 255 and simultaneously to bore 263. Spaced-apart flanges 265, 266 of elongated shaft 255 can retain gland seal 262 in axial position on shaft 255. Contact or biasing spring 267 acting against and/or contacting flange 266 biases contact assembly 250 forward. Spring backup washer 268 is restrained from backward movement by retainer ring 269 seated in groove 270 of receptacle base 217.

It is often desirable to keep contact assembly 250 rotationally aligned in a fixed position with respect to receptacle shell 2. Note that plug contact assembly 30 is rotationally fixed with respect to plug shell 3, which is described above. In that case, optical contacts 31 and 258 of the plug and receptacle units, respectively, always come together with the same rotational orientation when the plug and receptacle units are mated. That is particularly important when the optical contacts are of the angle-polished type. As shown in FIG. 10, flats 271 radially opposed on either side of elongated shaft 255 of receptacle contact assembly 250 can cooperate with flats 272 of spring backup washer 268 to keep contact assembly 250 and spring backup washer 268 rotationally aligned. Spring backup washer 268 can be a snug fit into bore 263 so that it resists or prevents rotation of receptacle contact assembly 250 with respect to bore 263 of receptacle base 217.

Figure 14:
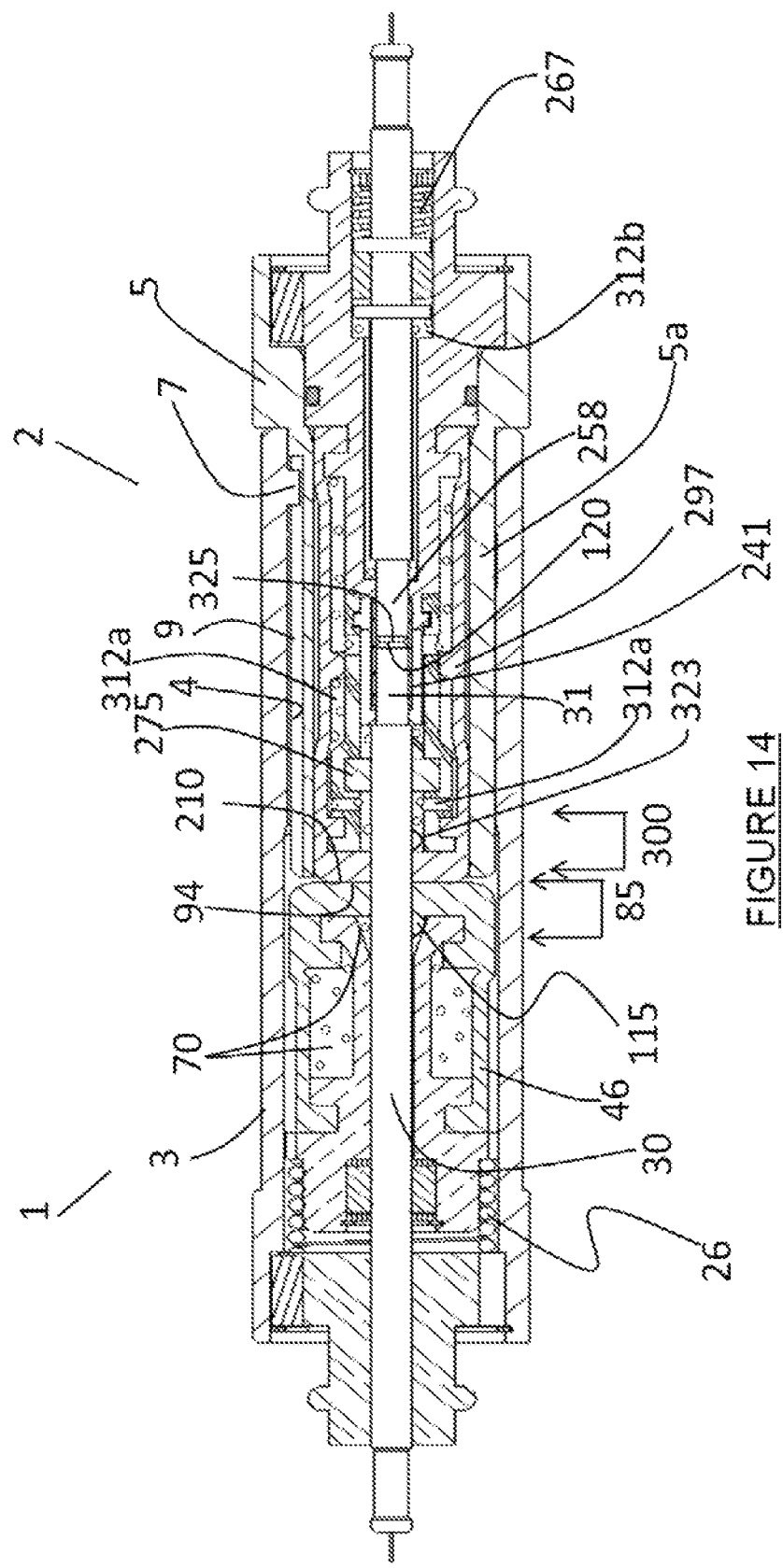
FIG. 14 is an axial cross-sectional view of mated plug and receptacle units of FIGS. 1A and 1B, respectively.

As shown in FIGS. 9 and 14, receptacle unit 2 can have an inner penetrable seal 275, which can be made of elastomeric material. Inner penetrable seal 275 can mount in seat 276 (see FIGS. 9 and 12) of receptacle inner shell 236, and can be fixed therein, for instance, by adhesive bonding or by other means. Inner penetrable seal 275 can be a monolithic tap-and-bore seal which can be constructed to function in the same way as end seal 85 of FIG. 7 described above.

Figure 13:
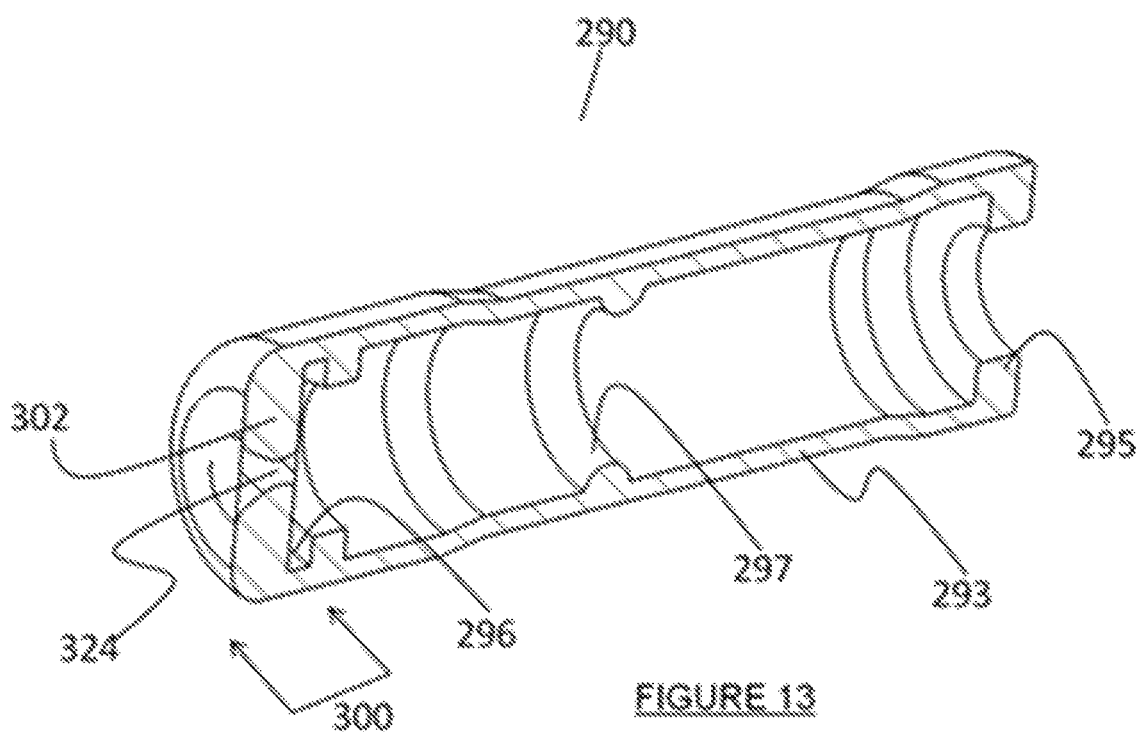
FIG. 13 is an axial cross-sectional perspective view of a receptacle bladder of the receptacle unit of FIG. 1B.

Receptacle bladder 290 (see FIGS. 9 and 13) can be made from elastomeric or other resilient material. Receptacle bladder 290 can include radial wall portion 293, inwardly projecting shoulder 295 at a back end of the bladder 290, groove 296 at or proximate a front end of bladder 290, inwardly projecting ring portion 297 between and spaced-apart from shoulder 295 and groove 296, and penetrable end seal 300 formed in or at forward end portion 302. Penetrable seal 300 can be a monolithic tap- and bore seal constructed in the same manner to function in the same way as end seal 85 of FIG. 7 described above.

In one embodiment, receptacle bladder 290 mounts onto and/or surrounds at least a portion of both receptacle inner shell 236 and receptacle base 217. Shoulder 295 of receptacle bladder 290 can fit sealably into and be retained by groove 298 on receptacle base 217. Internal groove 296 of receptacle bladder 290 can fit onto and be retained by shoulder 306 of receptacle inner shell 236 (see FIGS. 9, 12 and 13).

Referring now to FIG. 9, in one embodiment of the receptacle unit 2 in which there is no inner seal 275, fluid 310 (indicated by small circles in FIG. 9) can be found in one connected space extending from just within (i.e., rearward of) end seal 300 of receptacle bladder 290, through ports 311 in receptacle inner shell 236 (see FIGS. 9 and 12), and into areas or spaces 312a and 312b. For clarity, areas 312a and 312b are called out in several places on FIG. 9. Space 312b extends rearward through space 313 between bore 245 of receptacle base 217 and elongated shaft 255 of receptacle contact assembly 250, and on rearwardly to gland seal 262.

In another possible embodiment, receptacle unit 2 can include or be outfitted with inner seal 275. In this embodiment, space 312a can be fluidly sealed from space 312b by inner seal 275 and by inwardly projecting ring portion 297 of receptacle bladder 290 acting against outer diameter or wall 314 of receptacle inner shell 236. In this embodiment, spaces 312a and 312b are essentially two separate fluid chambers within receptacle unit 2: forward chamber 312a and rearward chamber 312b. Receptacle contact 258 and alignment sleeve 241 can both be within innermost space 312b. Vent ports 316 through wall 314 of inner shell 236 provide a path for fluid flow between the portions of chamber 312b that are within and outside of wall 314. There is at least one other embodiment of the presently disclosed technology involving a third variation of fluid chambers or areas within receptacle unit 2. In this third embodiment, as in the previously described one, there is inner seal 275, and an inward projecting ring portion 297 of receptacle bladder 290 acting in cooperation with outer diameter or wall 314 (see FIGS. 9 and 12) of receptacle inner shell 236. But in this third embodiment, inner ring portion 297 of receptacle bladder 290 can fit loosely to or against an outer surface of wall 314, thereby forming a leaky barrier against wall 314 of inner bladder shell 236. In this embodiment, fluid from spaces 312a and 312b can migrate past the leaky barrier between the two spaces, but cannot flow freely. The advantage to this embodiment is that if one of spaces 312a, 312b has a fluid pressure different from the other, as might occur if some pumping of fluid through inner seal 275 occurs during mating and/or demating operations, the pressure differential can be equalized through the leaky barrier. Any contamination that might be introduced into space 312a through mating and/or demating will still not have a freely flowing path into space 312b where the junction of receptacle contact 258 and plug contact 31 can take place (see, e.g., FIG. 14).

As shown in FIG. 1B, ventilation port 320 in forward end portion 5a of receptacle shell 5 can allow pressure within space 322 (see FIG. 9) surrounding flexible radial wall portion 293 of receptacle bladder 290 to equilibrate to the ambient pressure outside of receptacle shell 5 and thereby approximately balance, adjust or equal the pressure of fluid 310 to the ambient environmental pressure.

FIG. 14 illustrates fully mated plug unit 1 and receptacle unit 2 of one embodiment of the presently disclosed technology in axial half-section. As mating of the two units begins, forward end portion 5a of receptacle shell 5 enters front bore 4 of plug shell 3. Close conformance of forward end portion 5a of receptacle shell 5 with front bore 4 of plug shell 3 aligns the plug and receptacle units axially. As mating of the plug and receptacle units proceeds, plug alignment key 7 enters receptacle alignment keyway 9, thereby rotationally aligning the units. Further insertion of the receptacle unit into the plug unit causes face 210 of penetrable end seal 300 of receptacle bladder 290 to press against face 94 of penetrable end seal 85 of plug bladder 46.

In one embodiment, in order for the receptacle unit to proceed further into the plug unit, penetrable end seal 300 of receptacle bladder 290 must press against penetrable end seal 85 of plug bladder 46 with enough force to overcome the pre-load of spring 26 within plug 1. Once the preload has been overcome, receptacle unit 2 and the movable portions of plug unit 1 can push deeper into front bore 4 of plug shell 3 thereby causing contact 31 and the forward portion of elongated shaft 30 of plug contact assembly 28 to penetrate outward through penetrable end seal 85 of plug bladder 46, and thence through penetrable end seal 300 of receptacle bladder 290. As penetrable end seal 85 of plug bladder 46 is penetrated, portion 115, which can be relatively small, of tap 92 of plug bladder 46 extrudes back into fluid chamber 70 of plug 1. Similarly, as shown in FIG. 14, as the forward portion of elongated shaft 30 and contact 31 penetrate receptacle end seal 300 a portion 323, which can be relatively small, of receptacle tap 324 (see FIG. 13) is pushed into receptacle outer fluid chamber 312a (i.e., the opposite direction that portion 115 of tap 92 is drawn). Tap portion 323 is pushed in the direction of penetration because there is nothing to prohibit it moving in the direction of the force applied by the penetrating elements, whereas portion 115 of tap 92 of plug bladder 46 squirms backwards into chamber 70 of plug 1, contrary to the direction of the penetrating force as explained earlier. As face 120 of plug contact 31 passes through penetrable end seals 85, 300, face 120 is wiped clean as a result of contact with the penetrable end seals 85, 300.

Further engagement of the plug and receptacle units causes the forward portion of elongated shaft 30 and plug contact 31 to enter into fluid chamber 312a of receptacle unit 2, where it is bathed in fluid. If the device is a configuration that contains receptacle inner penetrable seal 275, additional engagement of the plug and receptacle units causes contact 31 and the forward portion of elongated shaft 30 of plug contact assembly 28 to first pass through forward, or outer fluid chamber 312a of receptacle unit 2, thence to pass through receptacle inner penetrable seal 275 and on into second, rearward, or inner fluid chamber 312b, where plug contact 31 is once again bathed in fluid.

In one embodiment, in the final stage of engagement of the plug and receptacle units, plug contact 31 enters alignment sleeve 241, in which face 120 of plug contact 31 presses against face 325 of receptacle contact 258, thereby forcing receptacle contact assembly 250 backward while at least slightly compressing biasing spring 267 in receptacle unit 2. Biasing spring 267 provides a small, controlled axial force to keep contact faces 120, 325 pressed together and in full contact. The steps involved in demating connector units 1 and 2 are just the reverse as those of mating the units. Note that at all times in the mating and demating operations, the fluid volumes of the plug and receptacle units remain sealed from each other and from the working environment due to the structural features shown and described herein.

The presently disclosed technology has been described herein as an example for connecting optical circuits; however, as mentioned earlier, the presently disclosed technology can equally well be used to connect other devices, such as electrical circuits. Pin-and-socket electrical junctions suitable for incorporation into the presently disclosed technology are readily available.

The preceding description relates to a one-circuit connector, but clearly the components of one circuit connectors, such as those described herein, can be grouped as modules within larger shell structures to create multiple circuit connectors. Furthermore, optical and electrical modules can be mixed in the same larger shell structures to create multiple-circuit, hybrid connectors.

The foregoing discussion illustrates that the presently disclosed technology provides a reliable connector embodying multiple levels of protection for the circuits from the working environment, while doing so with an uncomplicated, compact, and economical construction. In one embodiment, the presently disclosed technology can house both the plug and receptacle contacts within fluid chambers in the mated and unmated conditions. Each chamber has a very simple, independent, active closure means to keep it sealed from the other chambers and from the outside environment. The presently disclosed technology permits connector units to be built in a wide range of sizes and resistant materials making them suitable for both light and heavy duty applications. Compared to prior art connectors now on the market, the relative simplicity of the presently disclosed technology makes it particularly adaptable for miniaturization or other changes in size.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the presently disclosed technology. Thus, it is to be understood that the description and drawings presented herein represent presently preferred embodiments of the presently disclosed technology and are, therefore, representative of the subject matter which is broadly contemplated by the presently disclosed technology. It is further understood that the scope of the invention fully encompasses other embodiments that may become obvious to those skilled in the art and that the scope of the invention is accordingly limited by nothing other than the appended claims.

I claim:

1. A connector for sealably engaging and disengaging contacts therein, the connector comprising:
    a first unit having one or more closed chambers therein, each closed chamber of the first unit containing fluid and one or more first contacts, at least a portion of each closed chamber of the first unit being configured to be movable with respect to another portion thereof to permit pressure within the closed chamber to at least approximately equal pressure outside of the closed chamber;
    a second unit having one or more closed chambers therein, each closed chamber of the second unit containing fluid and one or more second contacts, each second contact being configured to engage one of the first contacts, at least a portion of each closed chamber of the second unit being configured to be movable with respect to another portion thereof to permit pressure within the closed chamber to approximately equal pressure outside of the closed chamber, the second unit being movable with respect to the first unit between an unmated position and a mated position,
    wherein, upon moving the first and second units from the unmated position to the mated position, the one or more first contacts contained within the one or more closed chambers of the first unit sealably penetrate into the one or more closed chambers of the second unit to engage the one or more second contacts therein,
    wherein, upon moving the first and second units from the mated position to the unmated position, the one or more first contacts are sealably withdrawn from the closed chamber of the second unit,
    wherein the one or more closed chambers of the first unit remain sealed from the one or more closed chambers of the second unit throughout the mating and demating of the first and second units, and
    wherein the one or more closed chambers of the first and second units remain sealed from a working environment of the connector throughout mating and demating of the first and second units.

2. The connector of claim 1, wherein the one or more first contacts include an elongated shaft with a conductive tip, and wherein the one or more second contacts include an elongated shaft with a conductive tip.

3. The connector of claim 1, wherein each closed chamber of the first unit has at least one first resilient end wall portion including a first bore and a first tap integrally formed with the first resilient end wall portion, the first tap being movable from a closed position to an open position with respect to the first bore, the first resilient end wall portion being configured to permit one of the first contacts to sealably exit the closed chamber by displacing the first tap from the closed position.

4. The connector of claim 3, wherein each closed chamber of the second unit has at least one second resilient end wall portion including a second bore and a second tap integrally formed with the second resilient end wall portion, the second tap being movable from a closed position to an open position with respect to the second bore, the second resilient end wall portion being configured to permit one of the first contacts to (i) sealably penetrate into the closed chamber by displacing the second tap from the closed position and engage one of the second contacts within the closed chamber, and (ii) be subsequently sealably withdrawn from the closed chamber thereby returning the first tap to the closed position.

5. The connector of claim 1, wherein the fluid in the one or more closed chambers of each of the first and second units is one of i) a dielectric fluid and ii) an optically transparent fluid or an optically transparent dielectric fluid, and wherein the one or more first contacts and the one or more second contacts are one of optical contacts and electrical contacts or electro-optical contacts.

6. The connector of claim 1, wherein the one or more closed chambers of the second unit includes a first closed chamber and a second closed chamber, the second closed chamber being spaced-apart from the first closed chamber along a longitudinal axis of the second unit.

7. A connector for sealably engaging and disengaging contacts therein, the connector comprising:
    a first unit having one or more fluid chambers therein, each fluid chamber of the first unit surrounding at least a portion of one or more first contacts, the one or more first contacts including an elongated shaft with a conductive tip, each fluid chamber of the first unit having at least one first resilient end wall portion including a first bore and a first tap integrally formed with the first resilient end wall portion, the first tap being movable from a closed position to an open position with respect to the first bore, the first resilient end wall portion being configured to permit one of the first contacts to sealably exit the closed chamber by displacing the first tap from the closed position; and
    a second unit having one or more fluid chambers therein, each fluid chamber of the second unit surrounding at least a portion of one or more second contacts, the one or more second contacts including an elongated shaft with a conductive tip, each second contact being configured to engage one of the first contacts, each fluid chamber of the second unit having at least one second resilient end wall portion including a second bore and a second tap integrally formed with the second resilient end wall portion, the second tap being movable from a closed position to an open position with respect to the second bore, the second resilient end wall portion being configured to permit one of the first contacts to (i) sealably penetrate into the fluid chamber by displacing the second tap from the closed position and engage one of the second contacts within the fluid chamber, and (ii)

be subsequently sealably withdrawn from the fluid chamber thereby returning the second tap to the closed position, the one or more fluid chambers of the first unit being sealed from the one or more fluid chambers of the second unit during mating and demating of the first and second units.

8. The connector of claim 7, wherein at least a portion of each fluid chamber of the first unit is configured to be movable with respect to another portion thereof to permit pressure within the fluid chamber to at least approximately equal pressure outside of the fluid chamber.

9. The connector of claim 7, wherein at least a portion of each fluid chamber of the second unit is configured to be movable with respect to another portion thereof to permit pressure within the fluid chamber to at least approximately equal pressure outside of the fluid chamber.

10. The connector of claim 7, wherein the second unit is movable with respect to the first unit between an unmated position and a mated position.

11. The connector of claim 10, wherein, upon moving the first and second units from the unmated position to the mated position, the one or more first contacts contained within the one or more fluid chambers of the first unit sealably penetrate into the one or more fluid chambers of the second unit to engage the one or more second contacts therein.

12. The connector of claim 11, wherein the one or more fluid chambers of the first and second units remain sealed from a working environment of the connector throughout mating and demating of the first and second units.

13. The connector of claim 7, wherein the first tap and the first bore are formed by a crescent-shaped cut through the first resilient end wall portion.

14. The connector of claim 7, wherein upon mating with the second unit a portion of the first tap extends into the fluid chamber of the first unit when one of the first contacts sealably exits the fluid chamber of the first unit.

15. The connector of claim 7, wherein a portion of the second tap extends into the fluid chamber of the second unit when one of the first contacts sealably penetrates into the fluid chamber of the second unit.

16. A connector for sealably engaging and disengaging contacts therein, the connector comprising:

a first unit having one or more fluid chambers therein, each fluid chamber of the first unit surrounding at least a portion of one or more first contacts; and a second unit having one or more fluid chambers therein, each fluid chamber of the second unit surrounding at least a portion of one or more second contacts, each second contact being configured to engage one of the first contacts, the second unit being movable with respect to the first unit between an unmated position and a mated position, wherein, upon moving the first and second units from the unmated position to the mated position, the one or more first contacts contained within the one or more fluid chambers of the first unit sealably penetrate into the one or more fluid chambers of the second unit to engage the one or more second contacts therein, wherein, upon moving the first and second units from the mated position to the unmated position, the one or more first contacts sealably withdraw from the one or more fluid chambers of the second unit, and wherein the one or more fluid chambers of the first unit remain sealed from the one or more fluid chambers of the second unit throughout mating and demating of the first and second units.

17. The connector of claim 16, wherein the one or more fluid chambers of the first and second units remain sealed from a working environment of the connector throughout mating and demating of the first and second units.

18. The connector of claim 16, wherein each fluid chamber of the first unit has at least one first resilient end wall portion including a first bore and a first tap integrally formed with the first resilient end wall portion, the first tap being movable from a closed position to an open position with respect to the first bore, the first resilient end wall portion being configured to permit one of the first contacts to sealably exit the fluid chamber by displacing the first tap from the closed position, and wherein each fluid chamber of the second unit has at least one second resilient end wall portion including a second bore and a second tap integrally formed with the second resilient end wall portion, the second tap being movable from a closed position to an open position with respect to the second bore, the second resilient end wall portion being configured to permit one of the first contacts to (i) sealably penetrate into the fluid chamber of the second unit by displacing the second tap from the closed position and engage one of the second contacts within the fluid chamber, and (ii) be subsequently sealably withdrawn from the fluid chamber of the second unit thereby returning the second tap to the closed position.

19. The connector of claim 16, wherein the one or more fluid chambers of the second unit includes a forward fluid chamber and a rearward fluid chamber, the rearward fluid chamber being spaced-apart from the forward fluid chamber along a longitudinal axis of the second unit, the forward fluid chamber being separate from the rearward fluid chamber.

* * * * *